Figure 6:
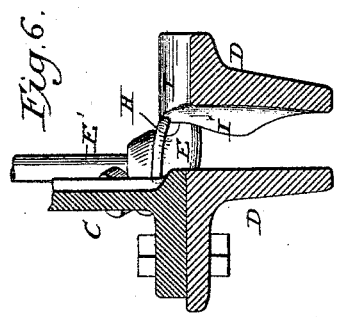

(No Model.) 3 Sheets—Sheet 1.
C. COLAHAN.
GRAIN BINDER.
No. 425,565. Patented Apr. 15, 1890.
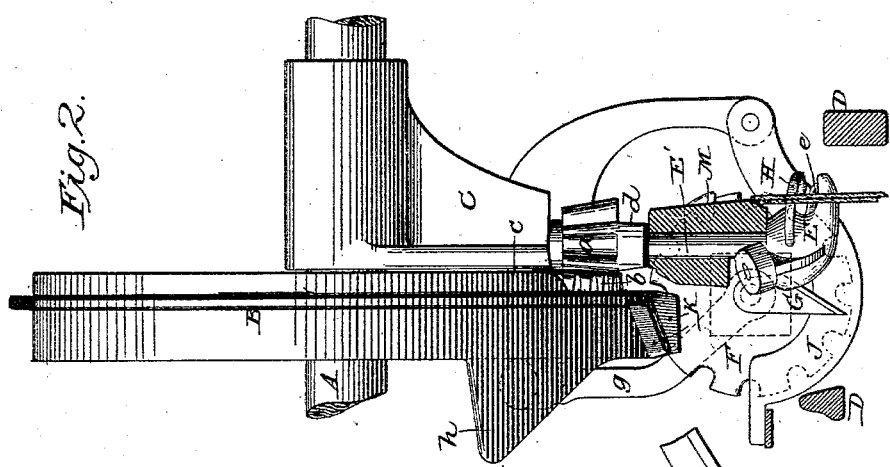
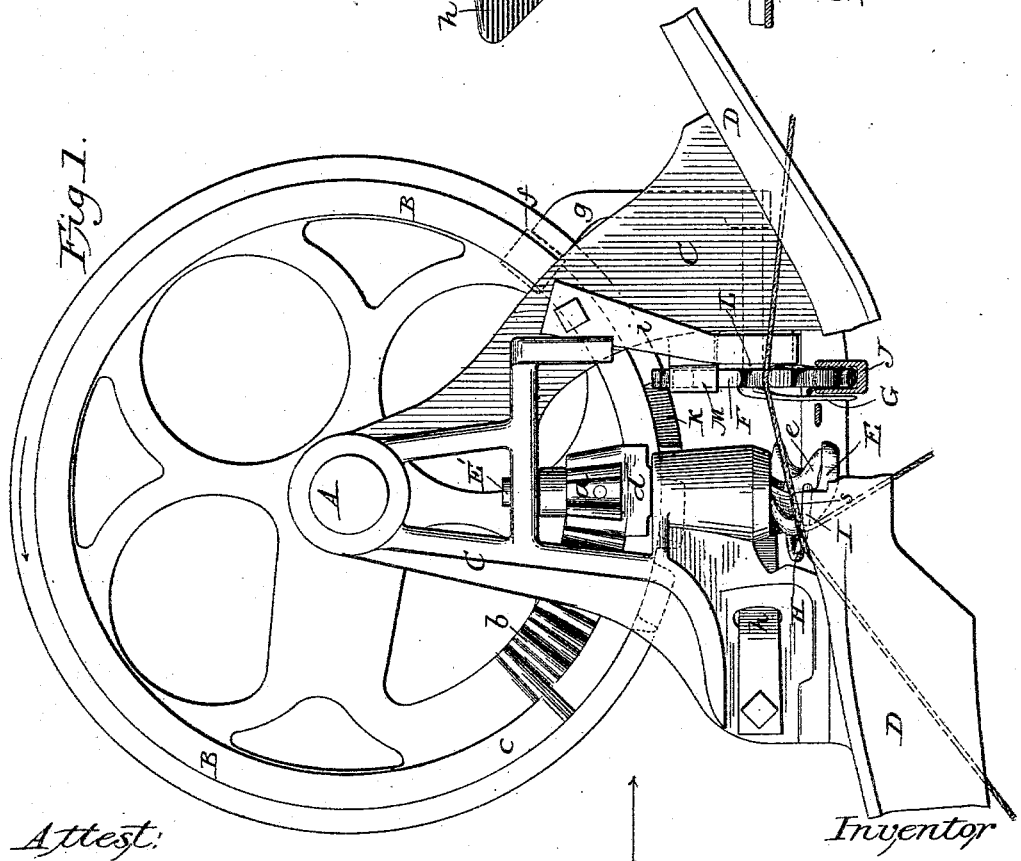
Attest:
Sidney P. Hollingsworth
Frederick B. Goodwin
Inventor
Chas Colahan (No Model.) 3 Sheets—Sheet 2.

C. COLAHAN.
GRAIN BINDER.

No. 425,565. Patented Apr. 15, 1890.

Attest:
Sidney P. Hollingsworth
Frederick F. Goodwin

Inventor:
Chas Colahan

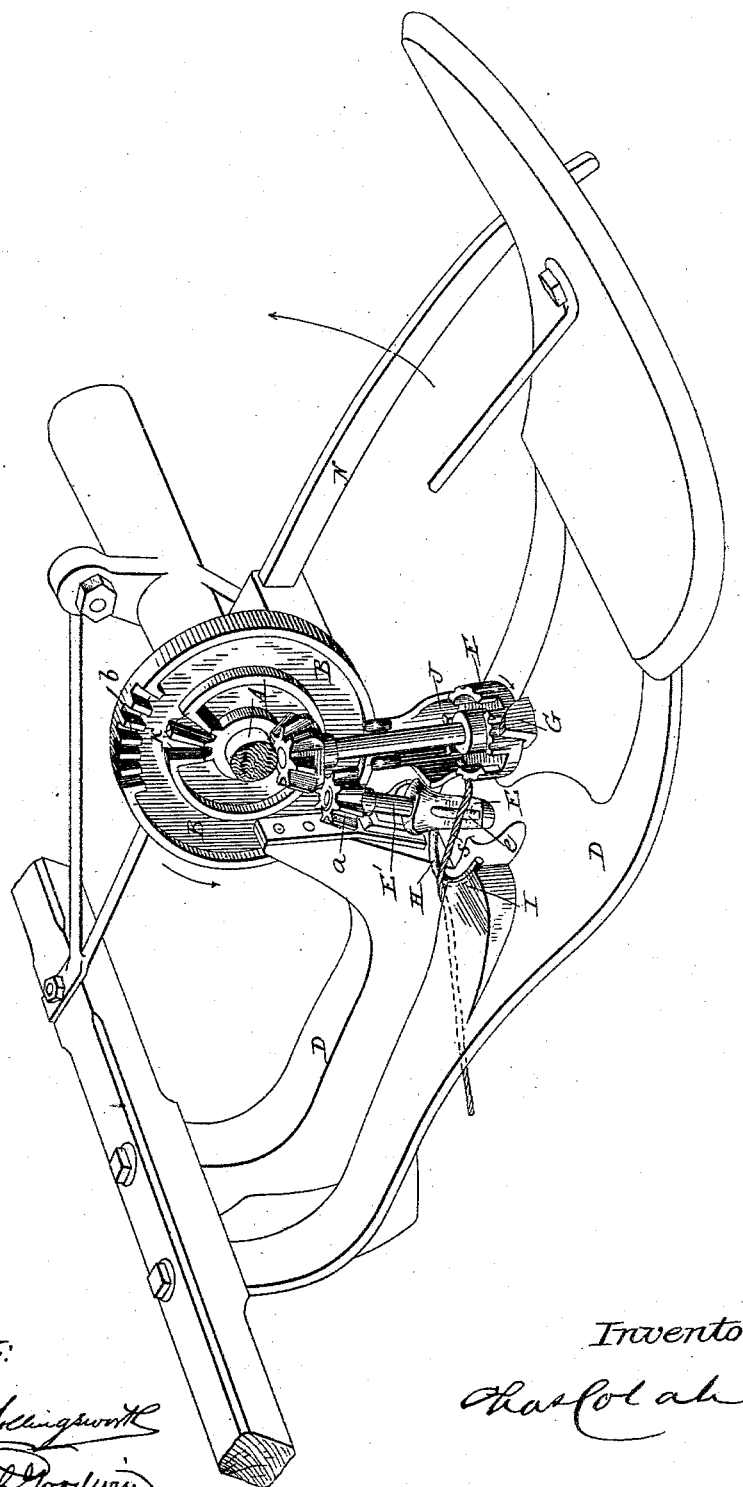

UNITED STATES PATENT OFFICE.

CHARLES COLAHAN, OF CLEVELAND, OHIO.

GRAIN-BINDER.

SPECIFICATION forming part of Letters Patent No. 425,565, dated April 15, 1890.

Application filed October 18, 1889. Serial No. 327,400. (No model.)

*To all whom it may concern:*

Be it known that I, CHARLES COLAHAN, a citizen of the United States, residing at Cleveland, county of Cuyahoga, and State of Ohio, have invented certain new and useful Improvements in Grain-Binders, of which the following is a specification.

This invention relates to the knotter mechanism; and it consists in combining with an open-slotted breast-plate a tying-bill pointed outwardly to discharge the knot, said tying-bill remaining in this normal position during the placing of the cord around the bundle, and said tying-bill is provided with a guard, which guard acts to support the cord in the otherwise unobstructed cord-slot of the breast-plate, and prevents the escape of the cord from the outwardly-pointing jaws of the tying-bill. The cord is thereby sustained in a plane above the knotter-jaws as it extends from said guard over the knotter-jaws to the cord-holder.

The invention also consists in the combination of the open-slotted breast-plate, the fixed rotating cord-holder, and the tying-bill provided with a cord-supporting finger or guard which supports the cord between the bundle and the tying-bill, and as the tying-bill revolves the cord escapes therefrom and falls on the knotter-jaws and furnishes slack cord for the loop while the tying-bill continues its operation, the jaws opening and grasping the ends of the cord and stopping with its jaws pointing outwardly, which position admits the withdrawal of the loop therefrom while the ends of the band are retained between the jaws until the discharge of the bundle.

For the purpose of illustration I have shown my invention operating in connection with the forms of cord-holders now in common use and known as the "flat disk" and "cup-disk." The proper rotation of either is intended to carry the cord across the plane of the breast-plate and the cord-slot therein and in a direction opposite the side of the tying-bill from which the cord is laid by the binder-arm, as shown in my former patents, so the knotter-jaws may readily grasp the ends of the cord before the shaft of the tying-bill stops in its revolution.

In my vertically-revolving flat disk (herein shown) I have provided intermediate notches located on its periphery between the cord-holding notches. Said intermediate notches serve as notches for the peripheral edge of the main knotter-driving-wheel, which may be provided with a flange to hold said disk from rotation at desired intervals while the teeth on said main driving-wheel may come in contact with any of the notches of said disk to cause it to revolve and grasp the cord and carry it toward the knotter; but only the intermediate non-cord-holding notches serve as stop surfaces or bearings for the peripheral edge or flange of the main wheel to hold the disk during its intervals of rest. This prevents abrasion of the cord-holding notches. A shield covers the said intermediate notch as the binder-arm is caused to lay the cord in the notch below and next to the elastically-supported shoe, into which or between said shoe and disk the cord is carried and held by the action of the disk.

Figure 5:
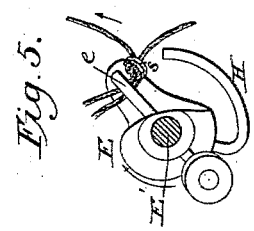
Figure 4:
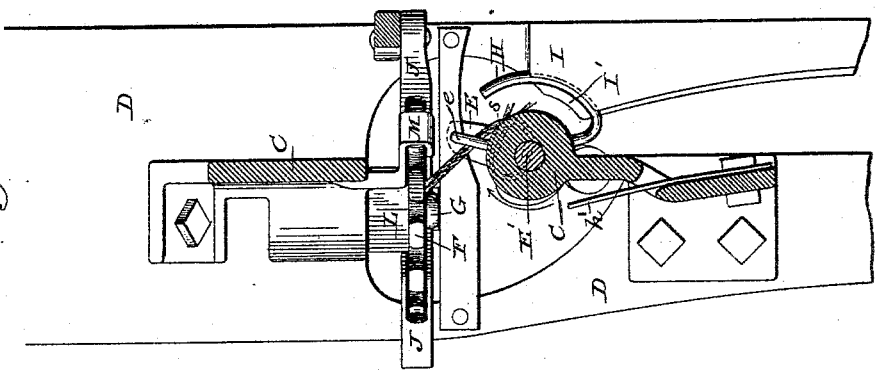
Figure 3:
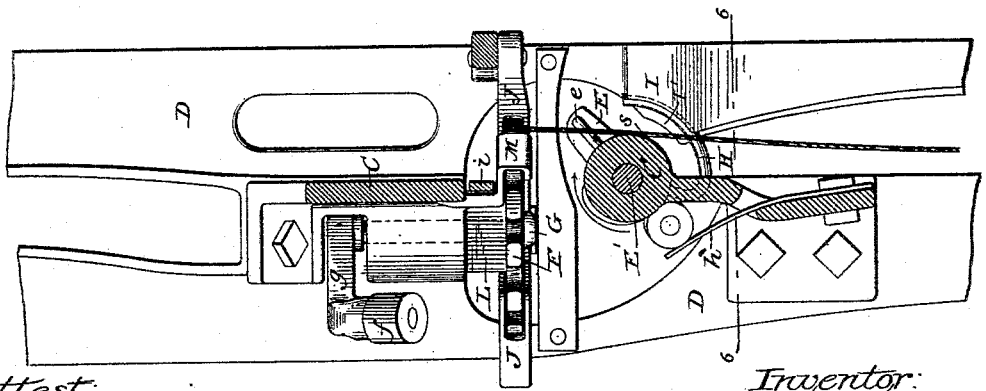

In the drawings, Figure 1 is an elevation of my knotting mechanism as seen from the rear, with part of the breast-plate broken away. Fig. 2 represents an edge view of the same, looking in the direction of the arrow in Fig. 1. Fig. 3 is a plan view of the same with the supporting-bracket broken and the driving-shaft and wheel removed. Fig. 4 is a similar view with the cord-knotter in a different position. Fig. 5 is a view of the knotter in position when the bundle is discharged. Fig. 6 is a cross-section on line 6 6 of Fig. 3. Fig. 7 is a perspective view of a knotting mechanism and attending parts, with my invention applied in connection with a different cord-clamping device.

Referring to the drawings, D represents the breast-plate.

B represents the main knotter-driving wheel.

C represents the standard, supported on the overhanging shaft A in the usual manner.

E represents the lower fixed jaw of the tying-bill. $e$ is its upper pivoted jaw. $h'$ is its actuating-spring.

E' is the tying-bill shaft; $a$, its pinion secured thereto; $b$, the actuating-gear, and $c$ its retaining-surface on the main wheel B.

$d$ is the delay-surface on the knotter-pinion.

F represents the intermittently-revolving cord-holding disk. J is its shoe, which is pivoted to the standard, and is held in contact with the cord-disk by a spring $i$, secured in any ordinary way to the knotter-supporting frame, causing it to press the cord against the disk.

G is the cord-cutting knife, the shaft of which extends through the disk and its bearing L, said shaft being provided at its outer end with the crank-arm g and its friction-roller f, which is acted upon by the projection h on the side of the main wheel B.

K represents the gear on the periphery of the main wheel B that intermittently actuates the disk.

M is the shield that covers the intermediate gear-notch to prevent the cord from entering the same as it is placed by the binder-arm in the cord-holding notch below.

I and I' represent projecting surfaces on the breast-plate at the point where the cord is laid by the binder-arm, and serve to guide the cord.

H represents a cord-supporting guard, which is secured to the tying-bill shaft and revolves therewith.

s represents that portion of the cord between the bundle and the tying-bill, out of which the knot is formed. This portion of the cord, extending from around the bundle upward through the slot in the breast-plate, is supported by the finger secured to the knotter-jaw. This cord-supporting finger lies across the open slot, and is so curved that it readily withdraws from under the cord as the tying-bill revolves to receive the cord and form the knot, in the usual well-known manner.

In operation this binder-head is used as a part of the completely-organized grain-binders in common use, and as the binder-arm places the cord around the bundle and into the notches of the cord-holding disk, the tying-bill being in its normal position, with its jaws pointing outwardly in the direction of the previously-discharged bundle, the cord adjacent to the bundle will be supported by the guard H, which prevents its escape from the tying-bill until it revolves across the slot in the breast-plate, when the cord, being confined by the side of the slot, will slip off from the guard H, and fall between said guard and the shaft of the tying-bill, which will take it in the usual manner, excepting that the cord, which has rested upon the guard H between the compressed bundle and the tying-bill, will be sufficiently slack to furnish cord for the loop of the knotter without causing undue strain upon the cord, and thus insure the formation of a perfect knot, which is drawn off the tying-bill as the bundle is discharged, the jaws of the tying-bill pointing outwardly in the direction of the bundle discharged, when the guard H assumes the normal position across the slot in the breast-plate, supporting the cord that it may be in proper position for the next bundle.

I do not claim herein as my invention a knotter having its normal position obliquely outward, in combination with a cord-slot extending past said knotter to permit the band to be carried therepast while still in the grasp of the knotting-jaws, and a stop-finger to arrest and support the cord until the knotter is turned to engage the same, as this is not broadly new with me; but

I claim as my invention—

1. In a grain-binder, the combination of a breast-plate provided with an unobstructed open slot extended beyond the tying-bill in the direction of the discharge of the bundle, and a cord-holder receiving the cord on the side opposite the tying-bill and carrying the ends toward the knotter to meet it as it revolves, and the open jaws of the tying-bill will seize the ends to form the knot which is discharged from the tying-bill as its jaws point outwardly in the direction in which the bundle is ejected, and a tying-bill which in its normal position stands with its jaws pointing outwardly, said tying-bill being provided with a guard or cord-supporting finger extending across said slot in the breast-plate to support the cord as it is laid thereon by the action of the binder-arm, said guard or cord-supporting finger being withdrawn by the revolving of the knotter which receives the cord and forms the knot therefrom, substantially as shown and described.

2. An open-slotted breast-plate, substantially as shown and for the purposes described, combined with a cord-holder that receives the cord from the binder-arm and carries it transversely across the slot in the breast-plate toward the tying-bill, and a tying-bill provided with a cord-supporting finger, operating substantially as shown and described.

3. The tying-bill J, provided with the cord-supporting finger H, extending across the open slot which receives the cord as it is laid thereon by the binder-arm, and also serves to furnish the slack cord by withdrawing from under the cord s for the formation of the loop, substantially as shown and described.

4. The combination of the breast-plate with an unobstructed cord-slot and a cord-supporting finger secured to the knotter and revolving therewith, said finger extending across the open cord-slot to receive and support the cord as the knotter-jaws point outwardly, and as it revolves away from the cord-slot in unison with the knotter-shaft admits the escape of the cord to the knotter-jaws for formation of the loop in the usual well-known manner, substantially as shown and described.

CHARLES COLAHAN.

Witnesses:
FREDERICK C. GOODWIN,
H. S. TOWLE.